(12) United States Patent
Ciray (10) Patent No.: US 6,915,876 B2
(45) Date of Patent: Jul. 12, 2005

(54) EXHAUST PROCESSOR WITH VARIABLE TUNING SYSTEM

(75) Inventor: Mehmet S. Ciray, Greenwood, IN (US)

(73) Assignee: Arvin Technologies, Inc., Troy, MI (US)

( * ) Notice: Subject to any disclaimer, the term of this patent is extended or adjusted under 35 U.S.C. 154(b) by 42 days.

(21) Appl. No.: 10/725,223

(22) Filed: Dec. 1, 2003

(65) Prior Publication Data

US 2004/0118632 A1 Jun. 24, 2004

Related U.S. Application Data

(63) Continuation of application No. 10/068,693, filed on Feb. 6, 2002, now Pat. No. 6,732,510.

(51) Int. Cl.[7] .............................. F02K 1/09; F01N 1/16; F02B 27/06
(52) U.S. Cl. ..................... 181/219; 181/241; 181/271; 181/277; 60/312; 60/322; 60/324
(58) Field of Search ............................ 181/219, 216, 181/241, 271, 277, 278, 249, 255, 269, 237, 254; 60/312, 322, 323, 324, 313, 314

(56) References Cited

U.S. PATENT DOCUMENTS

| | | | |
|---|---|---|---|
| 1,859,400 A | | 5/1932 | Kersey |
| 2,403,699 A | * | 7/1946 | Wilson ........................ 181/241 |
| 2,479,165 A | | 8/1949 | Jackson |
| 3,141,519 A | | 7/1964 | Bottum |
| 3,253,676 A | | 5/1966 | Bottum |
| 3,613,830 A | | 10/1971 | Hubbell |
| 3,620,330 A | | 11/1971 | Hall |
| 3,969,895 A | | 7/1976 | Krizman |
| 4,192,401 A | | 3/1980 | Deaver et al. |
| 4,320,815 A | | 3/1982 | Norris |
| 4,384,507 A | * | 5/1983 | Finn ............................ 181/241 |
| 4,484,659 A | | 11/1984 | Buchwalder |
| 4,537,279 A | | 8/1985 | Van Heeckeren |
| 4,539,947 A | | 9/1985 | Sawada et al. |
| 4,607,723 A | | 8/1986 | Okazaki |
| 4,665,692 A | | 5/1987 | Inaba |
| 4,699,244 A | | 10/1987 | Bergquist et al. |
| 4,715,472 A | | 12/1987 | McKee |
| 4,779,415 A | | 10/1988 | Richardson et al. |
| 4,858,722 A | | 8/1989 | Abbe et al. |
| 4,866,933 A | | 9/1989 | Kao |
| 4,867,768 A | | 9/1989 | Wagner et al. |
| 4,901,528 A | | 2/1990 | Saigo et al. |
| 4,903,486 A | | 2/1990 | Finkle |
| 4,913,260 A | | 4/1990 | Fallon |
| 5,189,266 A | | 2/1993 | Sasaki et al. |
| 5,233,137 A | | 8/1993 | Geddes |
| 5,283,398 A | | 2/1994 | Kotera et al. |
| 5,317,112 A | | 5/1994 | Lee |
| 5,388,408 A | | 2/1995 | Lawrence |
| 5,446,790 A | | 8/1995 | Tanaka et al. |
| 5,452,578 A | | 9/1995 | Barber |
| 5,475,189 A | | 12/1995 | Field et al. |
| 5,493,857 A | | 2/1996 | Komatsuda et al. |

(Continued)

FOREIGN PATENT DOCUMENTS

| | | |
|---|---|---|
| CH | 112462 | 1/1926 |
| DE | 200 18 827 U1 | 4/2001 |
| EP | 1 130 226 A2 | 9/2001 |
| FR | 1.261.203 | 4/1961 |
| JP | 57076220 | 5/1982 |
| JP | 403185210 A | 8/1991 |

OTHER PUBLICATIONS

European Search Report and Annex Thereto (2 pages).

Primary Examiner—Edgardo San Martin
(74) Attorney, Agent, or Firm—Barnes & Thornburg LLP (57) ABSTRACT

An exhaust processor comprises a Helmholtz resonance chamber with a variable tuning throat. The tuning frequency of the exhaust processor changes as the outlet opening from the variable tuning throat into the Helmholtz resonance chamber changes.

13 Claims, 11 Drawing Sheets

U.S. PATENT DOCUMENTS

| | | |
|---|---|---|
| 5,502,283 A | 3/1996 | Utaki et al. |
| 5,611,409 A | 3/1997 | Arseneau |
| 5,614,699 A | 3/1997 | Yashiro et al. |
| 5,621,656 A | 4/1997 | Langley |
| 5,655,367 A | 8/1997 | Peube et al. |
| 5,692,374 A | 12/1997 | Seki et al. |
| 5,708,237 A | 1/1998 | Maeda et al. |
| 5,712,454 A | 1/1998 | Ozawa et al. |
| 5,723,827 A | 3/1998 | Sasaki et al. |
| 5,723,829 A | 3/1998 | Inomata et al. |
| 5,739,483 A | 4/1998 | Yashiro et al. |
| 5,744,762 A | 4/1998 | Seki et al. |
| 5,785,014 A | 7/1998 | Cornwell |
| 5,821,474 A | 10/1998 | Olszok et al. |
| 5,917,161 A | 6/1999 | Fuhrmann |
| 5,921,081 A | 7/1999 | Kim |
| 5,930,371 A | 7/1999 | Cheng et al. |
| 5,946,908 A | 9/1999 | Motoyama et al. |
| 5,979,596 A | 11/1999 | Baker |
| 5,984,045 A | 11/1999 | Maeda et al. |
| 6,069,840 A | 5/2000 | Griffin et al. |
| 6,102,154 A | 8/2000 | Liu et al. |
| 6,105,716 A | 8/2000 | Morehead et al. |
| 6,158,546 A | 12/2000 | Hanson et al. |
| 6,173,808 B1 | 1/2001 | Maeda et al. |
| 6,176,347 B1 | 1/2001 | Chae et al. |
| 6,178,745 B1 | 1/2001 | Meusen |
| 6,349,541 B1 | 2/2002 | Gruden et al. |
| 6,508,331 B1 | 1/2003 | Stuart |
| 6,520,285 B2 * | 2/2003 | Tobias ........................ 181/241 |
| 6,769,511 B1 * | 8/2004 | Brooks et al. ............... 181/241 |
| 2004/0108162 A1 * | 6/2004 | Couvrette ................... 181/241 |

* cited by examiner

EXHAUST PROCESSOR WITH VARIABLE TUNING SYSTEM

CROSS-REFERENCE

The present disclosure is a continuation of U.S. patent application Ser. No. 10/068,693 which was filed Feb. 6, 2002, now U.S. Pat No. 6,732,510 and is hereby incorporated by reference herein.

BACKGROUND AND SUMMARY

This disclosure relates to an engine exhaust processor, and in particular, to an exhaust processor including a Helmholtz resonator. More particularly, this disclosure relates to an exhaust processor to attenuate noise associated with combustion product produced by the engine.

Noise in a vehicle exhaust system arises from acoustic waves that are generated by the sudden release of exhaust gases from individual cylinders in a vehicle engine. These acoustic waves travel from the engine exhaust manifold through a pipe to a muffler or other resonator on board the vehicle.

In order to dampen these acoustic waves to reduce the sound emitted by a vehicle, resonance chambers are provided in a muffler or other resonator to attenuate the acoustic waves. One type of resonance chamber is a Helmholtz resonator. A resonance chamber absorbs energy from the acoustic waves, which acts to silence somewhat the noise emitted from the muffler. Each resonance chamber is designed to "tune" or "silence" acoustic waves of a certain frequency.

According to the present disclosure, an exhaust processor includes an acoustic resonator and a resonator controller. The resonator includes a housing providing a static tuning volume and a tuning tube extending into that static tuning volume. The tuning tube receives engine combustion product. An outlet opening is formed in the tuning tube and arranged to lie in the static tuning volume and to place the static tuning volume in acoustic communication with acoustic waves associated with engine combustion product in the tuning tube.

The resonator controller functions to vary the size of the outlet opening so that the tuning frequency of the resonator can be changed by increasing or decreasing the size of the outlet opening. The resonator controller includes an outlet opening size regulator and a regulator operator for moving the regulator over the outlet opening formed in the tuning tube as a function of one or more selected "engine parameters" (e.g., engine rpm) to change the size of the outlet opening.

In an illustrative embodiment, the outlet opening is defined by a field of perforations formed in the tuning tube and the resonator controller includes a sleeve that is mounted to slide back and forth on the tuning tube either to "open" more perforations in the field (to increase the size of the outlet opening) or to "close" more perforations in the field (to decrease the size of the outlet opening). It is within the scope of this disclosure to use the exhaust processor disclosed herein to attenuate noise associated with combustion product produced by a wide variety of engines (including motor vehicle engines).

In an illustrative embodiment, the resonator controller further includes an engine mode detector that cooperates with the regulator operator to control movement of the sleeve (or other outlet opening size regulator) in a prescribed manner depending upon the "mode of operation" of the vehicle engine. Some engines have a variable mode of operating; for example, an eight-cylinder engine could be operated in four-, five-, or six-cylinder mode, depending on the "cylinder activation or deactivation" algorithm established in the engine. Engine combustion product is characterized by an "acoustic signature" unique to each mode of operation.

In this embodiment, the engine mode is sensed by the engine mode detector and the regulator operator included in the resonator controller is instructed to move the sleeve relative to the tuning tube to open and close perforations in the field in accordance with a "predetermined criteria" established in advance for each mode of engine operation and documented in the regulator operator or elsewhere in the exhaust processor. Thus, using the engine mode-sensitive resonator controller disclosed herein, the tuning frequency adjustment system of the acoustic resonator can be changed easily and automatically in a manner best suited to match the acoustic signature associated with each mode of engine operation.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is a side elevation view of an illustrative exhaust processor of the type diagrammed in FIG. 1, with portions broken away, showing a variable resonator including a static tuning volume provided by an exhaust processor housing and a perforated tuning tube extending through the housing and a resonator controller including an outlet opening size regulator comprising a sleeve that can move back and forth on the perforated tuning tube to vary the number of tuning tube perforations "open" to the static tuning volume provided in the housing around the perforated tuning tube so as to vary the size of the tuning tube "outlet opening" and thus the effective length of the tuning tube and a regulator operator comprising a motor, a sleeve mover, and a motion converter configured to reciprocate the sleeve mover in response to rotation of a shaft included in the motor, and showing that the sleeve has been moved to a fully extended position exposing eight rows of perforated openings;

DETAILED DESCRIPTION OF THE DRAWINGS

An exhaust processor 10 comprising a variable acoustic resonator 12 and a resonator controller 14 functions to silence or quiet noise associated with combustion product generated by engine 16. As suggested in FIG. 1, resonator 12 includes a tuning tube 18 provided with a variable size outlet opening 20 to communicate acoustic waves associated with engine combustion product admitted into tuning tube 18 through inlet opening 22 to a Helmholtz resonance chamber established by static tuning volume 24. Resonator controller 14 functions to change the size of outlet opening 20 during operation of engine 16 by moving an outlet opening size regulator 26 over outlet opening 20 in tuning tube 18. This movement of regulator 26 increases or decreases the size of outlet opening 20 under the control of a regulator operator 28 that senses an engine parameter 30 (e.g., engine r.p.m.) of engine 16 and moves regulator 26 in response to real-time changes in engine parameter 30 that occur during operation of engine 16 so as to vary the size of outlet opening 20 during engine operation to "tune" or "silence" acoustic waves associated with engine combustion product extant in tuning tube 18. Tunable acoustic systems are disclosed in U.S. Pat. Nos. 5,930,371 and 4,539,947. Those disclosures are hereby incorporated by reference herein.

Figure 2:
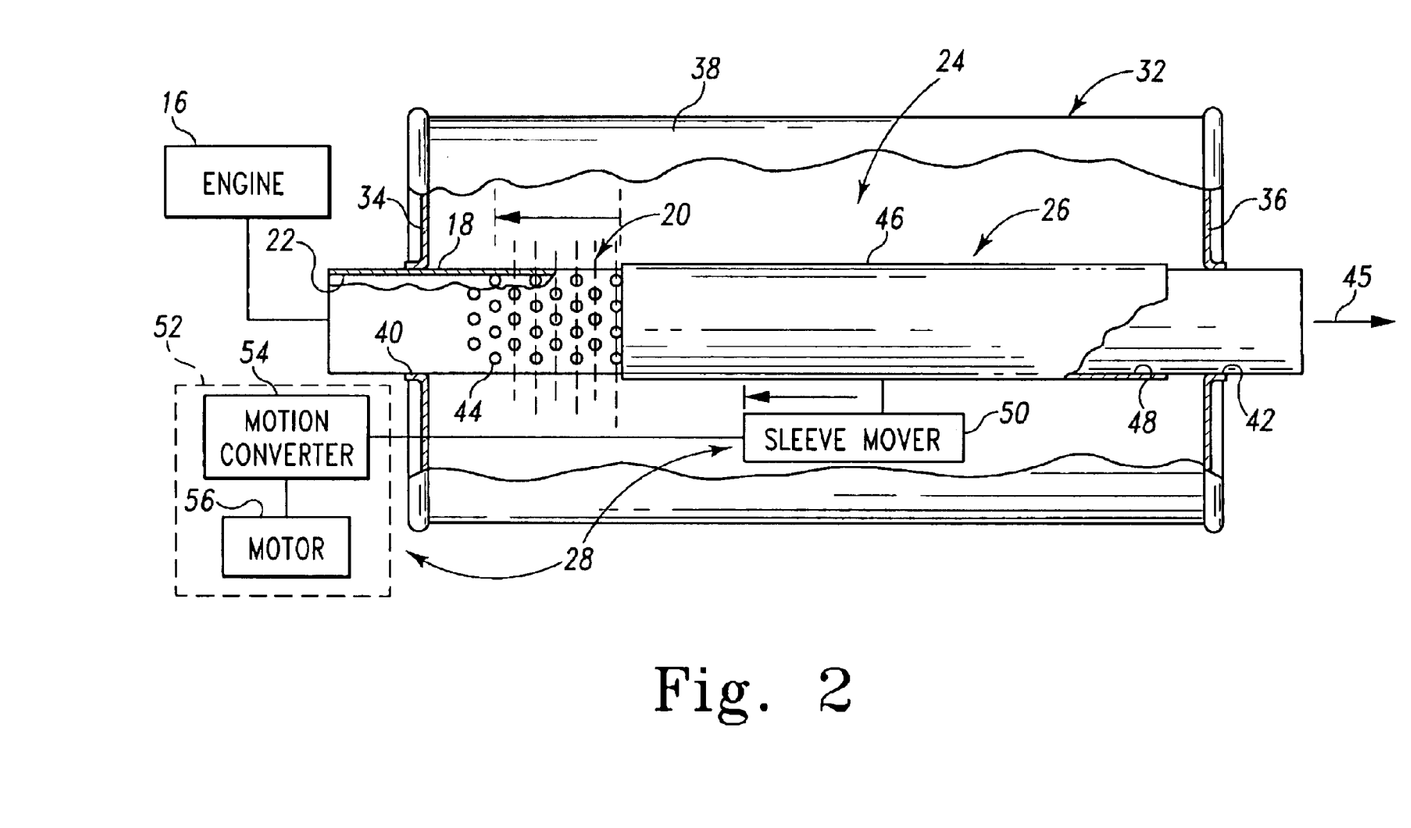
Figure 3:
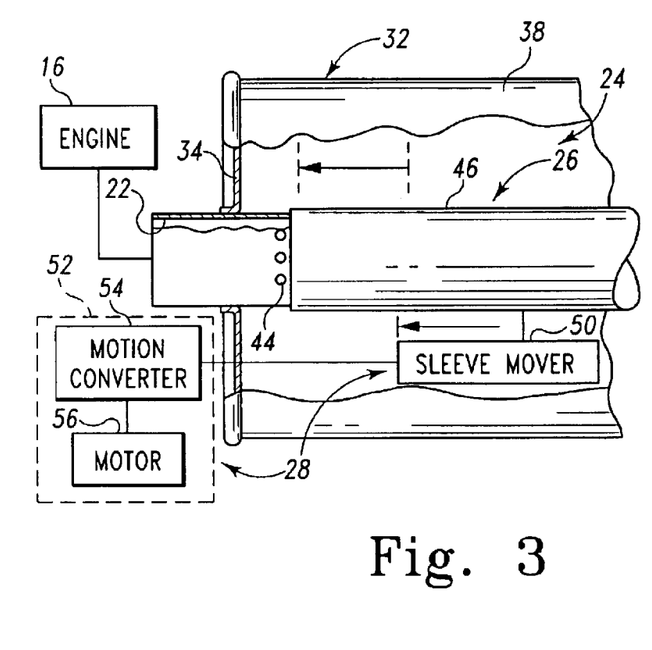
FIG. 3 is a view similar to FIG. 2 showing that the sleeve has been moved to a fully retracted position exposing one row of perforated openings.
Figure 4:
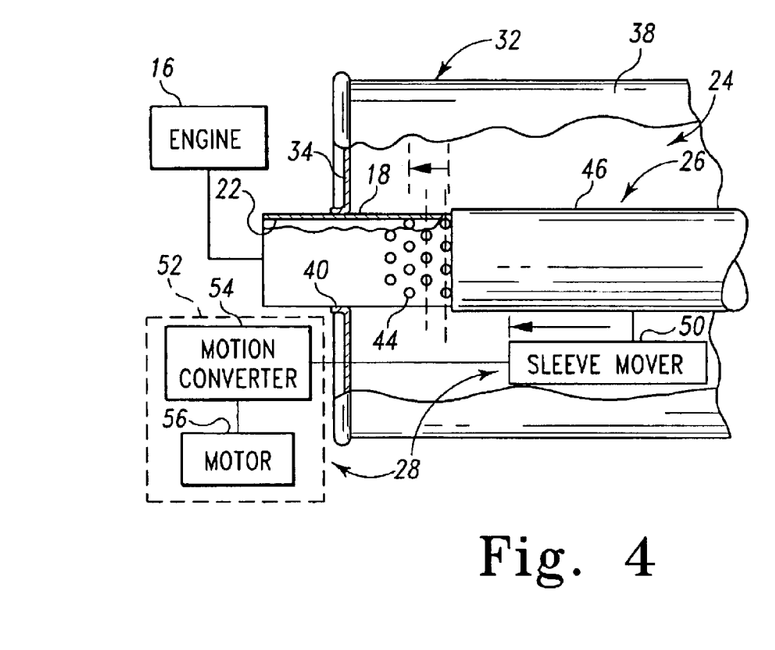
FIG. 4 is a view similar to FIGS. 2 and 3 showing that the sleeve has been moved to a midway position to increase the effective length of the tuning tube by exposing four rows of perforated openings.

In an illustrative embodiment, a tuning tube 18 extends into a static tuning volume 24 provided in a resonator housing 32 as shown, for example, in FIGS. 2–4. Housing 32 includes first and second end walls 34, 36 and a side wall 38 arranged to extend from first end wall 34 to second end wall 36. An inlet end of tuning tube 18 extends through an aperture 40 formed in first end wall 34 and an outlet end of tubing tube 18 extends through an aperture 42 formed in second end wall 36. A field of perforations 44 arranged, for example, in longitudinally spaced-apart annular rows, is formed in tuning tube 18 to define outlet opening 20. Acoustic waves (not shown) associated with combustion product (not shown) in tuning tube 18 are communicated to static tuning volume 24 in housing 32 via opened perforations 44 in the perforation field. Combustion product discharged from tuning tube 18 is discharged therefrom in direction 45 to a downstream destination.

A sleeve 46 formed to include a longitudinal passageway 48 receiving tuning tube 18 therein is mounted for back-and-forth (or other) movement on tuning tube 18 in static tuning volume 24 to open and close perforations 44 so as to increase or decrease the effective size of outlet opening 20. Regulator operator 28 comprises a sleeve mover 50 coupled to sleeve 46 and a mover driver 52 coupled to sleeve mover 50. Mover driver 52 comprises, for example, a motor 54 and a motion converter 56 for converting an output (e.g., rotary movement of a drive shaft) of motor 52 into reciprocating movement of sleeve mover 50. In one embodiment, motion converter 56 is a rack-and-pinion mechanism of the type suggested diagrammatically in FIG. 5.

In operation, sleeve 46 can be moved by regulator operator 28 to open a maximum number of perforations 44 (so as to maximize the size of outlet opening 20) as shown, for example, in FIG. 2 or close most of perforations 44 (so as to minimize the size of outlet opening 20) as shown, for example, in FIG. 3. By leaving at least one perforation 44 open (or uncovered by sleeve 46), acoustic waves associated with engine combustion product in tuning tube 18 are transmitted into the static tuning volume 24 around tuning tube 18. Sleeve 46 is positioned to open eight annular rows of perforations 44 in FIG. 2, one annular row of perforations 44 in FIG. 1, and four annular rows of perforations 44 in FIG. 4. It is within the scope of this disclosure to position sleeve 46 relative to the field of perforations 44 so that movement of sleeve 46 to the right (in FIG. 2) decreases the size of outlet opening 20.

Figure 5:
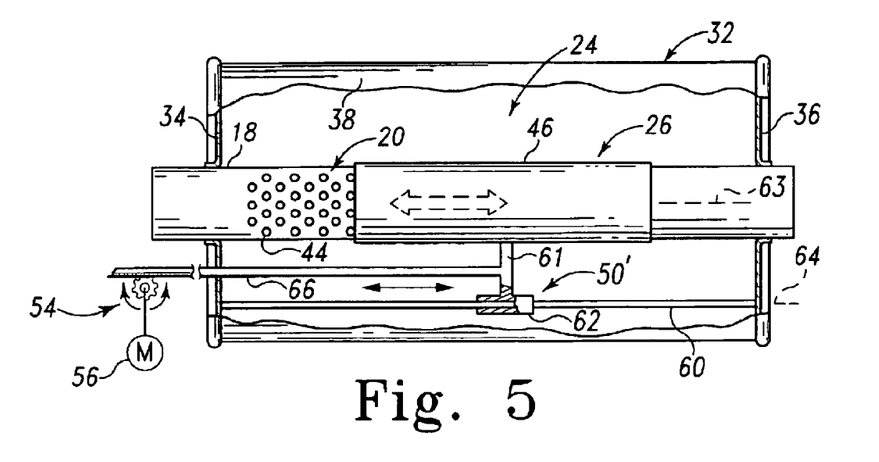
FIG. 5 is a view similar to FIG. 3 showing an illustrative embodiment of a motion converter and a first illustrative embodiment of a sleeve mover.
Figure 6:
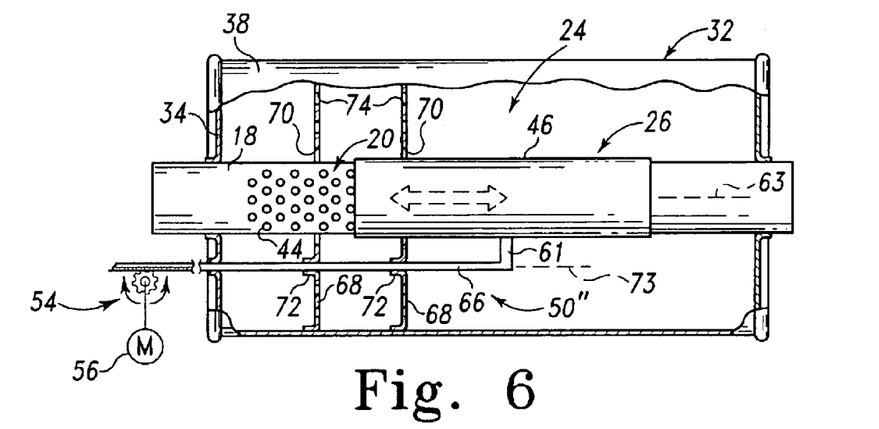
FIG. 6 is a view similar to FIG. 5 showing a second illustrative embodiment of a sleeve mover.
Figure 7:
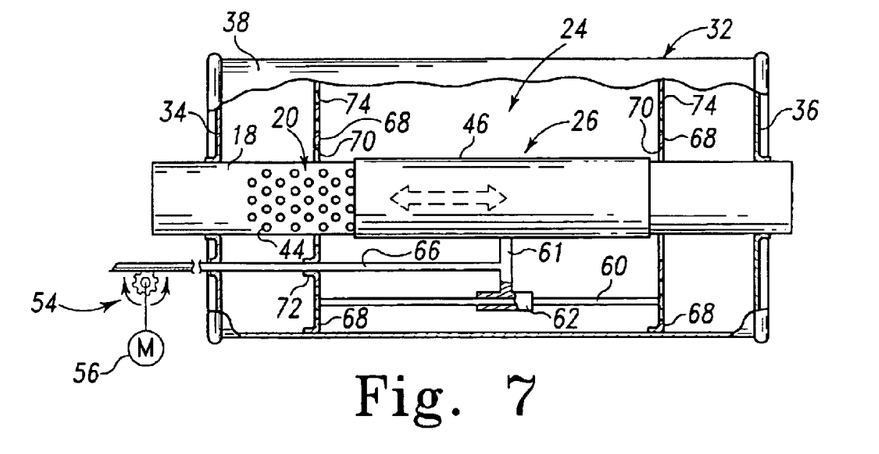
FIG. 7 is a view similar to FIGS. 5 and 6 showing a third illustrative embodiment of a sleeve mover.

Several illustrative examples of sleeve movers 50 are shown in FIGS. 5–7. These sleeve movers 50 are configured to cause sleeve 46 to move back and forth on tuning tube 18 along an axis that is coextensive with the central longitudinal axis 63 of tuning tube 18.

As shown in FIG. 5, sleeve mover 50' comprises a guide rod 60 mounted in a fixed position in housing 32 and a slidable collar 62 coupled to sleeve 46 by a post 61 and mounted for sliding movement on guide rod 60 to cause sleeve 46 to move relative to tuning tube 18 along an axis 63 parallel to a longitudinal axis 64 established by quick rod 60. A push-pull rod 66 is coupled at one end to motion converter 54 and at another end to post 61. In the illustration in FIG. 5, guide rod 60 is coupled at one end to first end wall 36 and is coupled at an opposite end to second end wall 38. It is within the scope of this disclosure to couple the ends or other portions of guide rod 60 to resonator housing 32 or other structures associated with resonator housing 32 to establish a fixed position of guide rod 60 within housing 32.

As shown in FIG. 6, sleeve mover 50'' includes a post 61 coupled to a push-pull rod 66 which, in turn, is coupled to motion converter 54. Housing 32 further includes one or more interior baffles 68. Each baffle 68 is positioned to lie inside housing 32 between first and second end walls 36, 38. Baffle 68 is formed to include a first aperture 70 receiving tubing tube 18 (and also sized to receive sleeve 46) therein and a second aperture 72 receiving push-pull rod 66 therein to support rod 66 for movement along a longitudinal central axis 73 parallel to axis 63 of tuning tube 18. Each baffle 68 can be formed to include one or more other apertures 74 as shown, for example, in FIG. 6 to adjust the tuning frequency of the exhaust processor in a desired manner.

As shown in FIG. 7, sleeve mover 50''' includes a guide rod 60 mounted at one end to one interior baffle 68 and at another end to another interior baffle 68. The baffles 68 are positioned to lie in housing 32 between first and second end walls 36, 38 and in spaced-apart relation to one another. Push-pull rod 66 extends through aperture 72 formed in one of baffles 68 and interconnects motion converter 54 and post 61.

Figures 8, 9:
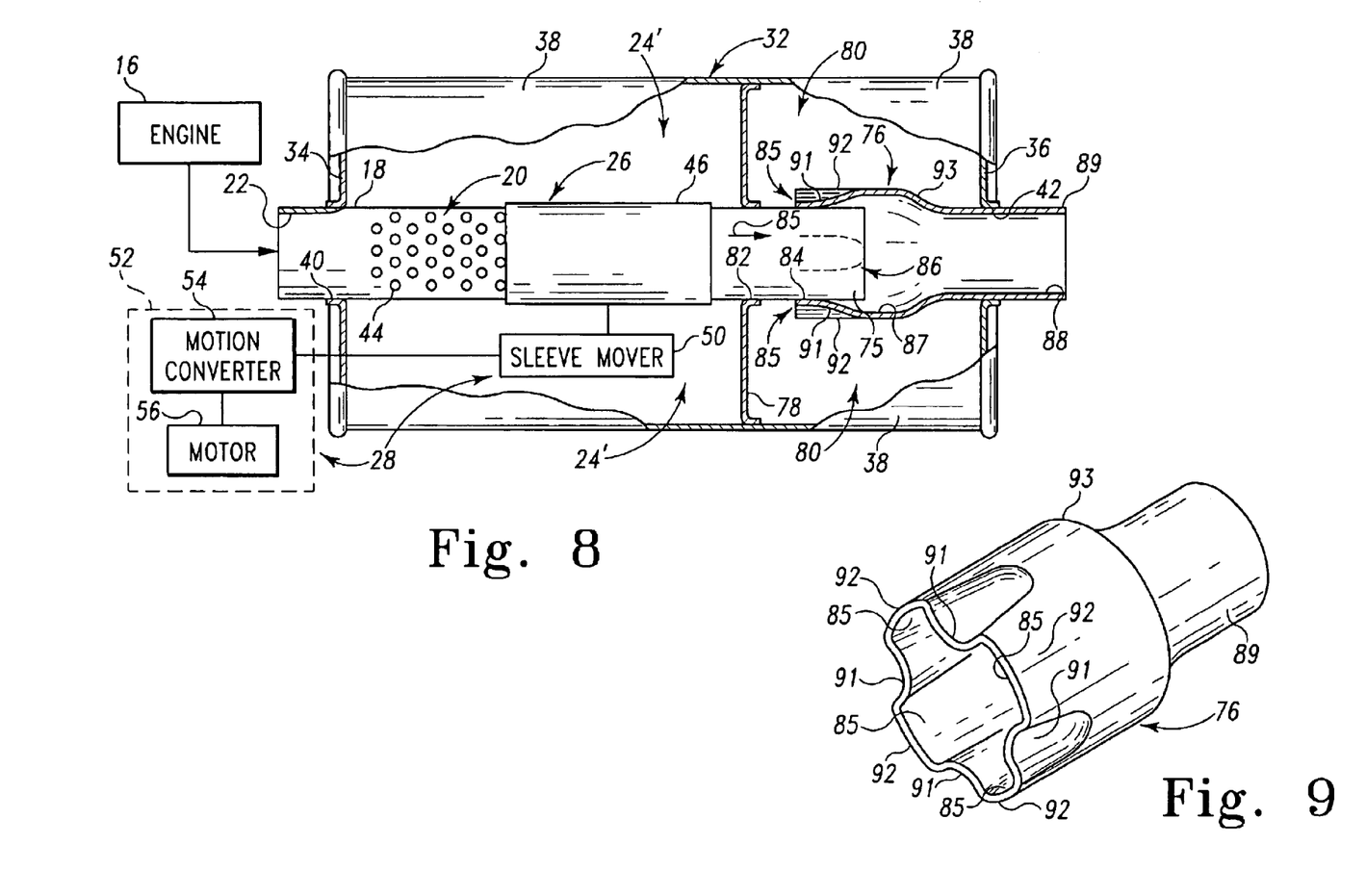
FIG. 8 is a view similar to FIG. 7 showing another illustrative exhaust processor wherein an outlet end of a perforated tuning tube carrying a movable sleeve is coupled to a low-frequency tuning tube communicating with a second static tuning volume located in the housing "alongside" an upstream first static tuning volume communicating with the perforated tuning tube.
FIG. 9 is an enlarged perspective view of the low-frequency tuning tube shown in FIG. 8.

It is within the scope of this disclosure to couple a low-frequency tuning tube 76 to an outlet end 75 of tuning tube 18 as shown, for example, in FIG. 8. It is also within the scope of this disclosure to arrange a baffle 78 in housing 32 to partition the interior region of housing 32 to define a static tuning volume 24' between first end wall 34 and baffle 78 and a low-frequency static tuning volume 80 between baffle 78 and second end wall 36. Baffle 78 is coupled to side wall 38 to lie in a fixed position in the interior region of housing 32 in the embodiment shown in FIG. 8. Outlet end 75 (or other portion) of tuning tube 18 is arranged to extend through a central aperture 82 formed in baffle 78. Sleeve 46 is mounted on the portion of tuning tube 18 positioned to lie in static tuning volume 24' for movement relative to tuning tube 18 to open and close perforations 44.

Low-frequency tuning tube 76 is formed to include a first inlet opening 84 coupled in fluid communication to a second outlet opening 86 formed in outlet end 75 of tuning tube 18 as shown, for example, in FIG. 8. Low-frequency tuning tube 76 is also formed to include a first outlet opening 85 arranged to lie in low-frequency static tuning volume 80 to place low-frequency static tuning volume 80 in acoustic communication with acoustic waves associated with engine combustion product extant in low-frequency tuning tube 76. This "coupling" of tuning tubes 18, 76 allows engine combustion product flowing in a downstream direction 85 through tuning tube 18 to empty into a passageway 87 formed in low-frequency tuning tube 76 before it is discharged from tuning tube 76 through a second outlet opening 88 formed in an outlet end 89 (of tuning tube 76) extending through an aperture 42 formed in second end wall 36 as shown, for example, in FIG. 8.

Low-frequency tuning tube 76 comprises a large-diameter inlet section 90, a smaller diameter outlet section 89, and a necked-down conical transition section 93 interconnecting inlet and outlet sections 90, 89 as shown, for example, in FIGS. 8 and 9. As shown in FIGS. 8 and 9, inlet section 90 includes four circumferentially spaced-apart depressions 91 that are sized and located to mate with an exterior surface of outlet end 75 of tuning tube 18 to couple low-frequency tuning tube 76 to tuning tube 18 in the manner specified herein. Inlet section 90 further includes four tunnel sections 92 configured to define first outlet openings 85 and arranged so that each tunnel section 92 lies between a pair of adjacent depressions 91 as shown best for example, in FIG. 9.

In operation, low-frequency static tuning volume 80 provides a low-frequency Helmholtz resonance chamber. Low-frequency acoustic waves associated with engine combustion product passing through passageway 87 formed in tuning tube 76 are passed through first outlet openings 85 also formed in tuning tube 76 and then tuned in low-frequency static tuning volume 80. At the same time, sleeve 46 located in static tuning volume 24' can be moved by regulator operator 28 to cause acoustic waves of other frequency associated with engine combustion product passing through tuning tube 18 and its first outlet opening 20 defined by the field of perforations 44 to be tuned in static volume chamber 40'.

Figure 10:
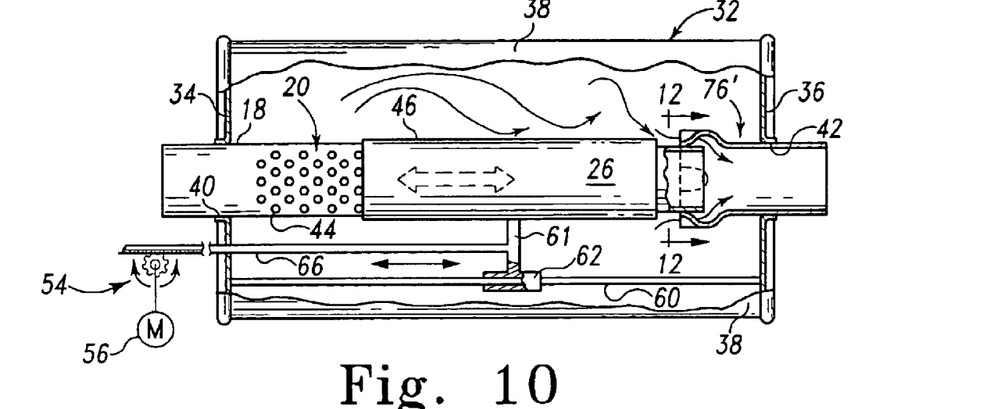
FIG. 10 is a view similar to FIG. 8 showing another illustrative exhaust processor including a low-frequency tuning tube coupled to an outlet end of a perforated tuning tube carrying a sleeve wherein the perforated tuning tube and the low-frequency tuning tube share a common static tuning volume provided in the exhaust processor housing.
Figure 11:
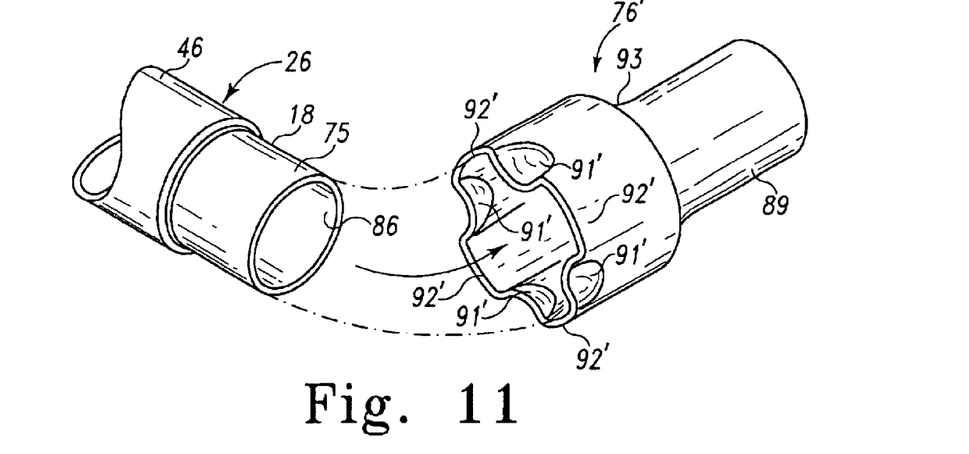
FIG. 11 is an enlarged perspective assembly view showing the outlet end of the perforated tuning tube before it is inserted into an inlet end of the low-frequency tuning tube.
Figure 12:
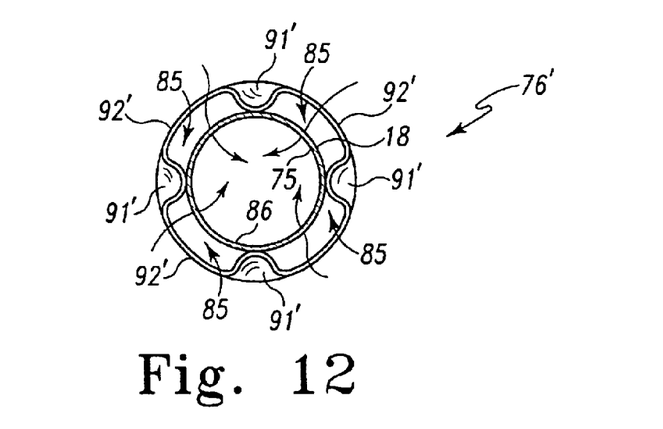
FIG. 12 is an enlarged sectional view taken along line 12—12 of FIG. 10 showing the outlet end of the perforated tuning tube mounted in the inlet end of the low-frequency tuning tube.

It is within the scope of this disclosure to use tuning tubes 18 and 76 in series without any interior baffle (such as baffle 78 shown in FIG. 8) as shown, for example, in FIG. 10 so that each of first outlet opening 20 of tuning tube 18 and first outlet opening 85 of low-frequency tuning tube 76 communicates with a single Helmholtz resonator chamber defined by static tuning volume 24 within housing 32. It is also within the scope of this disclosure to vary the size and shape of low-frequency tuning tube as can be seen in a comparison of tube 76 shown in FIGS. 8 and 9 and tube 76' shown in FIGS. 10–12 to alter the low-frequency tuning capability of such a tube.

In an embodiment shown in FIGS. 13–16, an interior baffle 110 is mounted in the interior region of resonator housing 32 for movement relative to side wall 38. Baffle 110 partitions the interior region of housing 32 to define a first static tuning volume 24' between first end wall 34 and baffle 110 and a second static tuning volume 24'' between baffle 110 and second end wall 36. In the illustrated embodiment, a portion of the first outlet opening 20 defined by the field of perforations 44 is arranged to lie in each of the static tuning volumes 24' and 24''. The first and second static tuning volumes 24' and 24'' vary in size as baffle 110 is moved back and forth inside housing 32 as shown, for example, in FIGS. 13 and 14. Baffle 110 can be formed to include vent apertures 112 as shown, for example, in FIGS. 13–15 or without vent apertures as shown, for example, in FIG. 16 to provide the exhaust processor designer with flexibility to tune certain frequencies.

Figure 13:
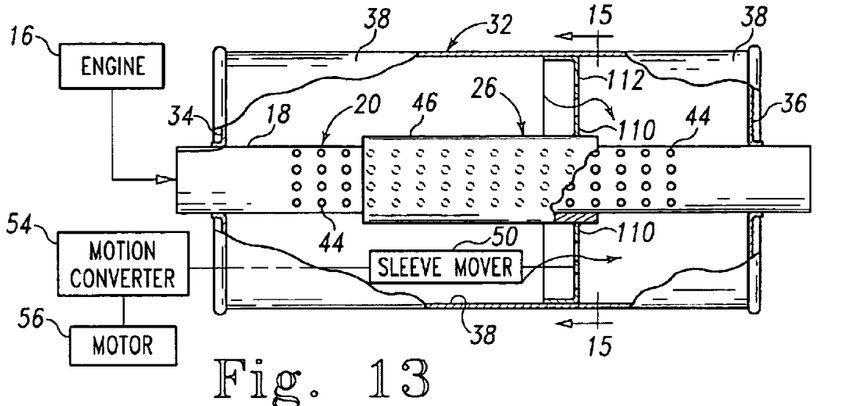
FIG. 13 is a side elevation view of another illustrative exhaust processor, with portions broken away, showing an exhaust processor housing partitioned by a movable baffle to define first and second static tuning volumes, a perforated tuning tube extending through the housing and a central aperture formed in the movable baffle, a sleeve coupled to the baffle to move therewith back and forth on the perforated tuning tube, and a sleeve mover coupled to the movable baffle.
Figure 14:
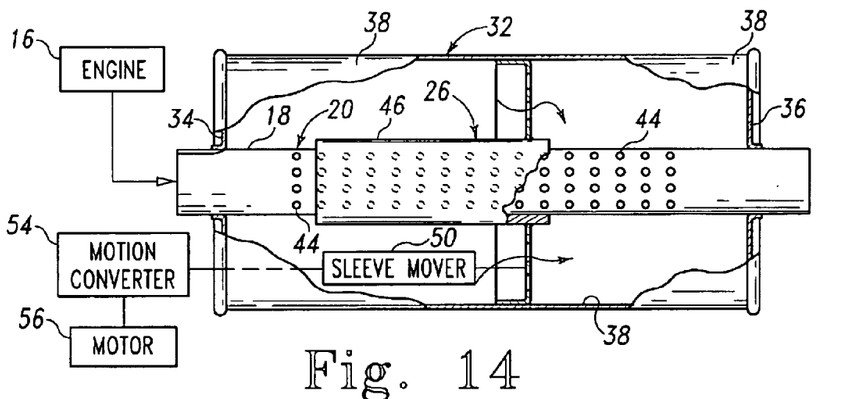
FIG. 14 is a view similar to FIG. 13 showing use of the sleeve mover to move the baffle in the housing to change the size of each of the first and second static tuning volumes and to move the sleeve on the perforated tuning tube so that fewer tuning tube perforations "open" into the upstream first static tuning volume and more tuning tube perforations open into the downstream second static tuning volume.
Figure 15:
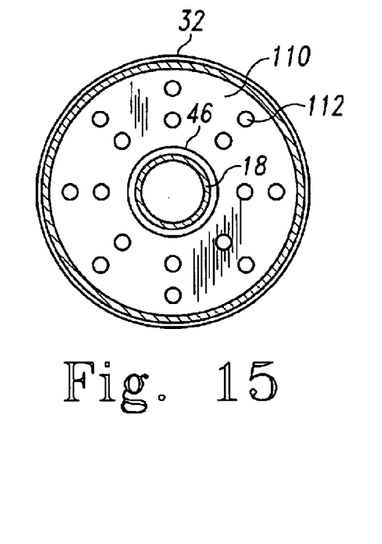
FIG. 15 is an enlarged sectional view taken along line 15—15 of FIG. 13 showing flow apertures formed in the movable baffle.
Figure 16:
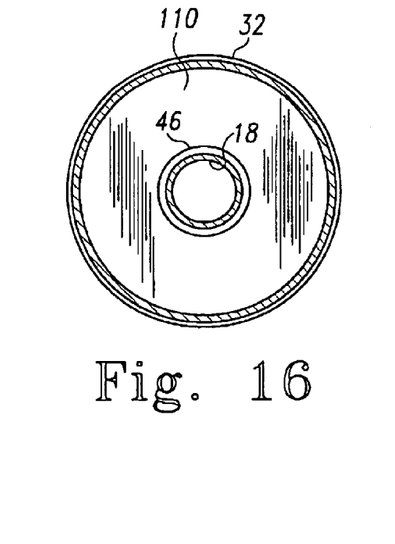
FIG. 16 is a view similar to FIG. 15 showing a movable baffle without any flow apertures.

Sleeve 46 is coupled to baffle 110 for movement therewith relative to tuning tube 18 and side wall 38 as also shown in FIGS. 13 and 14. Sleeve mover 50 extends into first static tuning volume 24' through an aperture formed in the housing 32 to move relative to housing 32 to control movement of baffle 110 and sleeve 46 relative to the tuning tube 18 extending through sleeve 46 and a central aperture formed in baffle 110.

Figure 17:
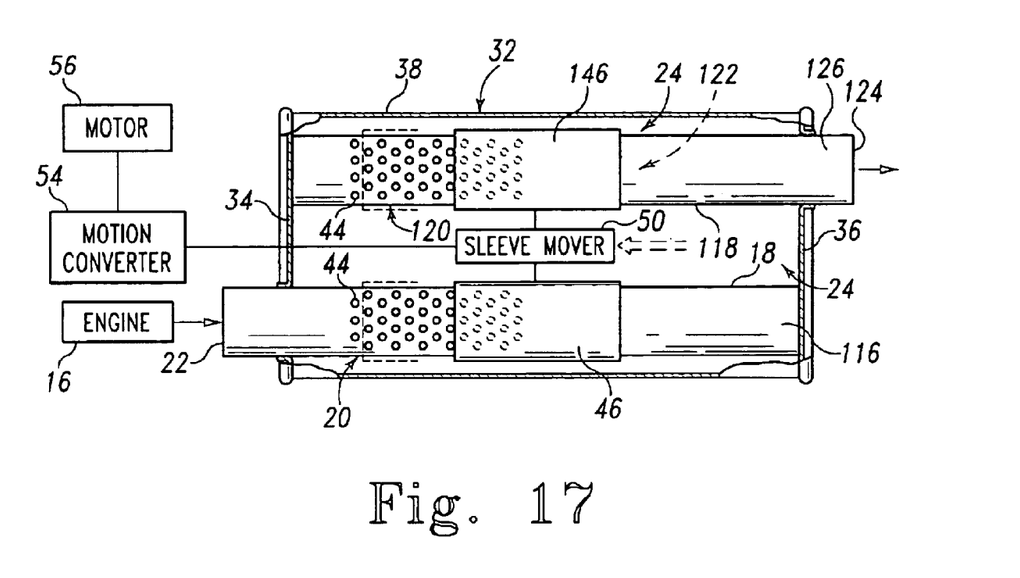
FIG. 17 is a side elevation view of another illustrative exhaust processor, with portions broken away, showing a perforated inlet tube, a perforated outlet tube, and a sleeve mover adapted to move sleeves mounted for sliding movement on the perforated inlet and outlet tubes.
Figure 18:
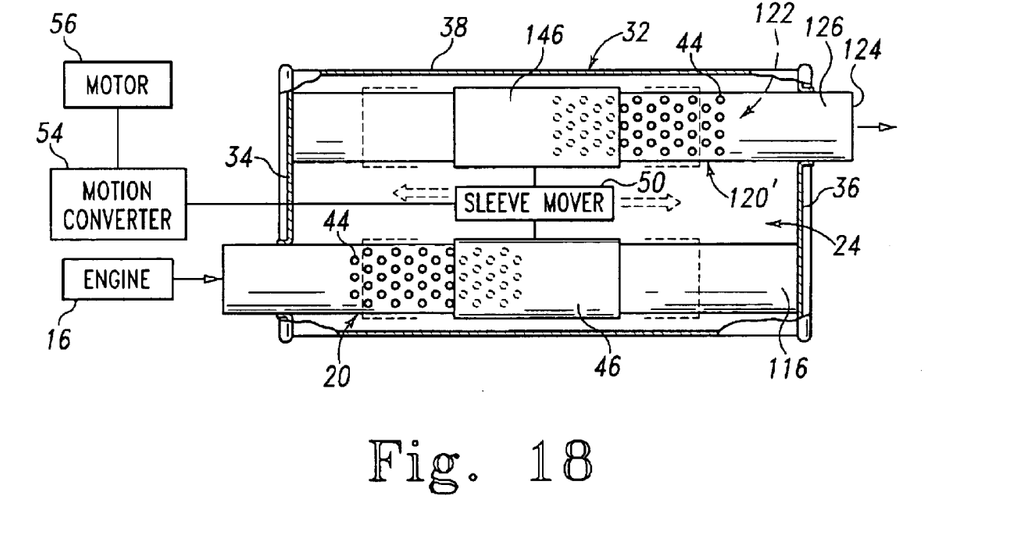
FIG. 18 is a view similar to FIG. 17 showing placement of the perforations in the outlet tube in a location different than that shown in FIG. 17.

Referring now to embodiments shown in FIGS. 17 and 18, it will be seen that it is within the scope of this disclosure to cause a second tube 118 to extend through an aperture 116 formed in second end wall 36 into static tuning volume 24 and lie, for example, in spaced-apart parallel relation to tuning tube 18. In this embodiment, tuning tube 18 is closed at its downstream end 116 so that all engine combustion product admitted into tuning tube 18 through inlet opening 22 is discharged into static tuning volume 24. Second tube 118 is formed to include an inlet opening 120 arranged to lie in static tuning volume 24 to allow engine combustion product therein to pass into a passageway 122 formed in second tube 118. That passageway 122 has an outlet opening 124 formed in outlet end 126 of second tube 126.

A second sleeve 146 is mounted for movement in static tuning volume 24 alongside tube 118 as shown, for example, in FIG. 17 to vary the size of inlet opening 120 formed in second tube 118. Sleeve mover 50 is coupled to each of sleeves 46, 146 to cause those sleeves 46, 146 to move together as a unit relative to tuning tubes 18, 118 in response to operation of motor 56 and motion converter 54. In the embodiment of FIG. 17, the inlet openings 20, 120 are located so that movement of sleeves 46, 146 in one direction minimize the size of both of those openings 20, 120 whereas, in the embodiment of FIG. 18, the inlet openings 20, 120 are located so that movement of sleeves 46, 146 in one direction minimizes the size of inlet opening 20 and maximizes the size of inlet opening 120. It is also within the scope of this disclosure to omit second sleeve 146.

Figure 1:
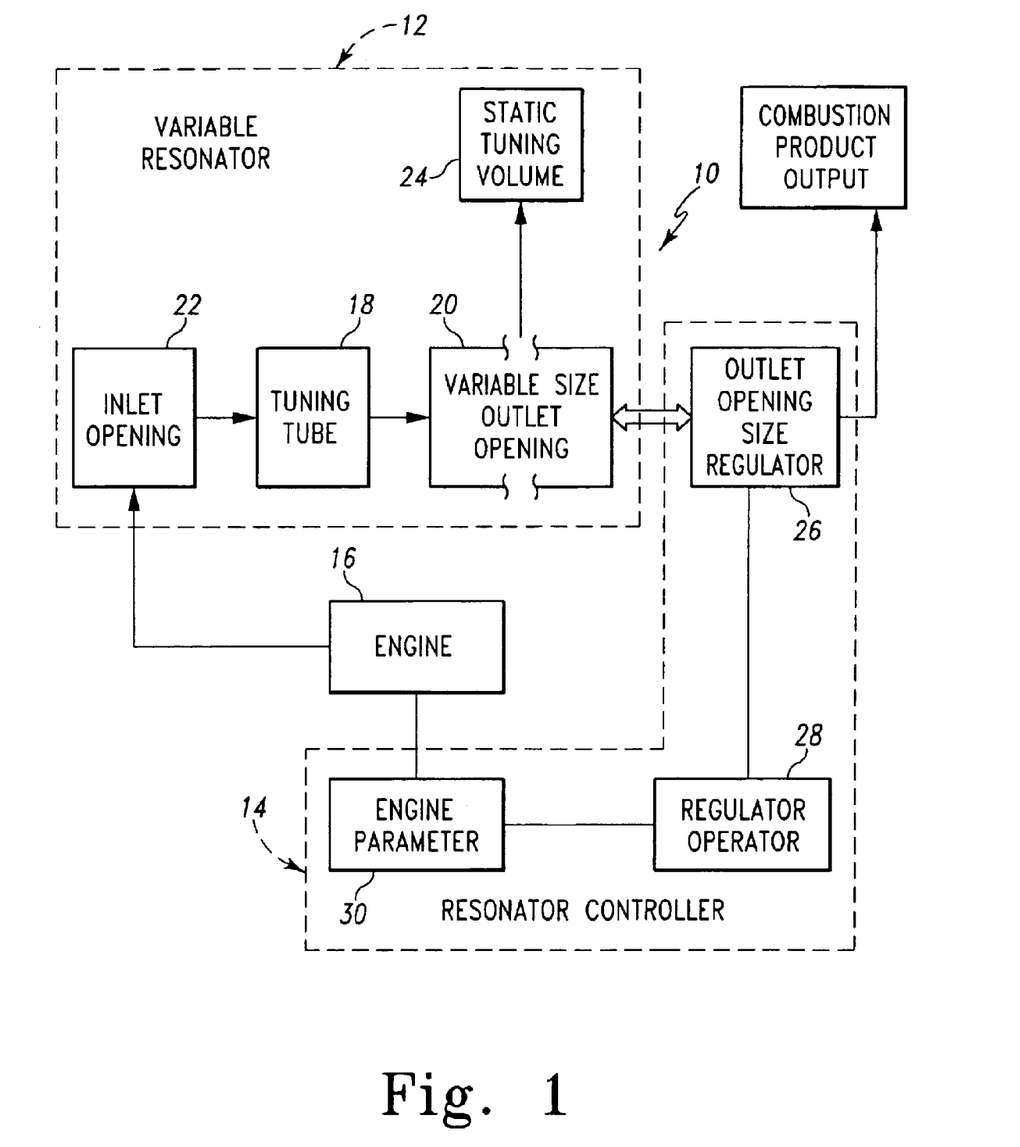
FIG. 1 is a diagrammatic view of an exhaust processor in accordance with the present disclosure showing a variable resonator configured to conduct combustion product exhausted by an engine through a tuning tube and a resonator controller that monitors an engine parameter (e.g., engine r.p.m.) and causes the size of the outlet opening from the tuning tube into a static tuning volume to vary continuously as a function of that engine parameter during engine operation so that the "effective length" of the tuning tube coupled to the static tuning volume is varied to attenuate noise associated with engine combustion product in accordance with a predetermined criteria.
Figure 19:
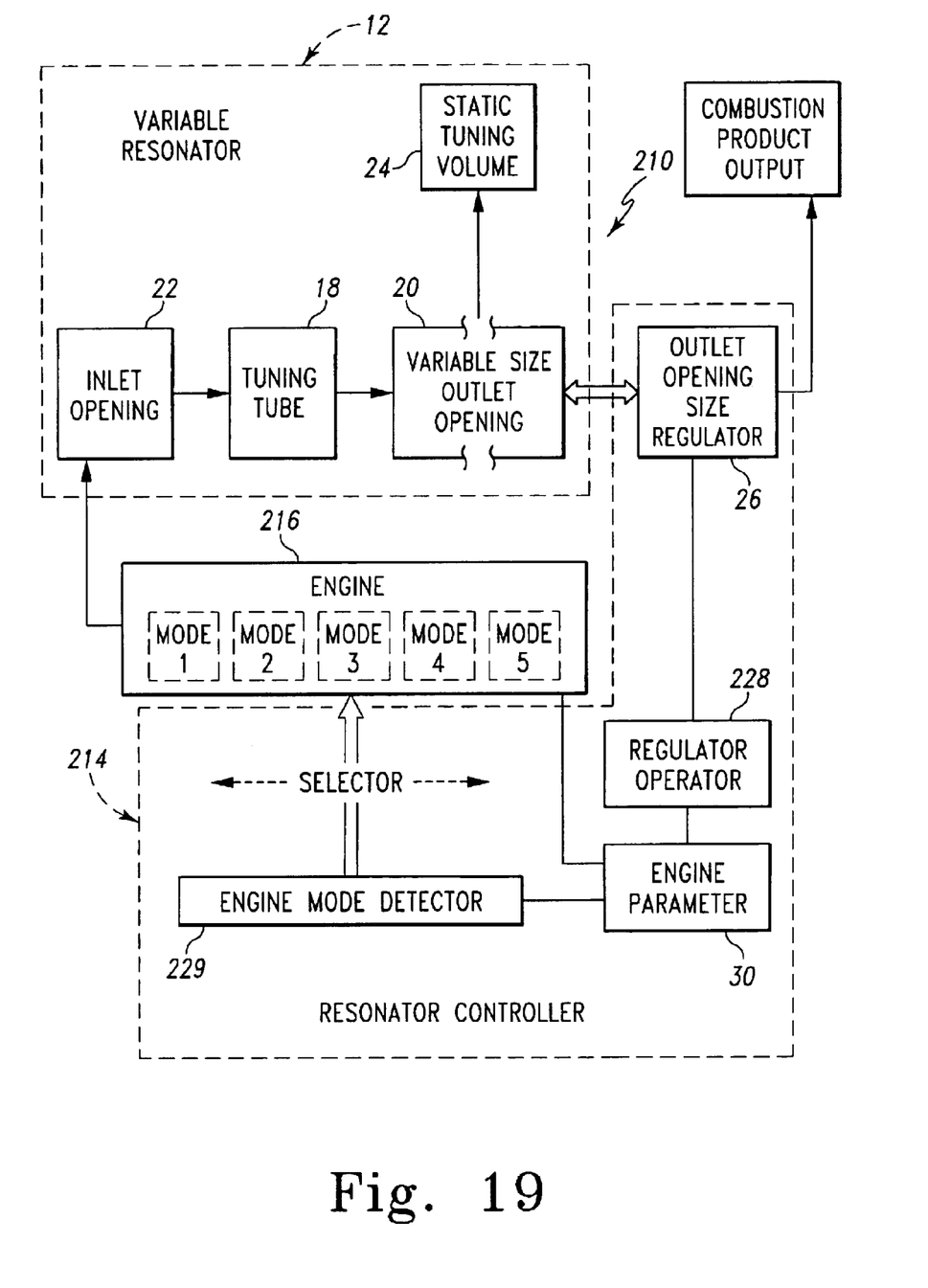
FIG. 19 is a diagrammatic view of another exhaust processor in accordance with the present disclosure showing a variable resonator and a resonator controller including an engine mode detector coupled to the engine and configured to detect the engine mode (e.g., 4, 5, 6, or 8 cylinder operation) selected by a vehicle operator or apparatus to regulate operation of the resonator controller using the engine parameter in a manner suited to the selected engine mode.

An exhaust processor 210 similar to exhaust processor 10 of FIG. 1 is shown diagrammatically in FIG. 19. In this embodiment, engine 216 is operable in five different modes, resonator controller 214 further comprises an engine mode detector 228 coupled to engine 216, and regulator operator 228 is configured to move outlet opening size regulator 26 based on real-time changes in engine parameter 30 (e.g., engine r.p.m.) in accordance with a predetermined criteria established in advance for each mode of operation of engine 216.

A wide variety of power trains (e.g., solenoid-controlled valve trains, camless engines, and cylinder deactivation technologies) pose tuning challenges to exhaust system designers due to increased complexity and cost associated with suitable tuning devices. The changing "operating mode" of an engine (e.g., an eight-cylinder engine could operate in four-, five-, or six-cylinder mode depending on the "cylinder activation or deactivation" algorithm established in the engine) could require an exhaust system designer to tune all of these individual engine operating modes with, potentially, several tuning elements. Given the packaging and performance constraints of vehicles, consumers would welcome an exhaust silencer able to respond actively to engine operating modes in accordance with the present disclosure so as to minimize the need for passive silencers for each engine operating mode. The resonator controller in accordance with the present disclosure is able to perform without increasing the restriction (back pressure) of the exhaust system and thus does not have a negative impact on engine power output.

The displacement of outlet opening size regulator 26 relative to variable size outlet opening 20 formed in tuning tube 18 is controlled via a muffler control unit (MCU) incorporated in or linked to regulator operator 228. The electronic map stores data for regulator displacement versus the required tuning frequency.

In operation, regulator operator 228 moves regulator 26 relative to tuning tube 18 as a function of one or more engine parameters (e.g., engine r.p.m.) according to a predetermined criteria established for each mode of operation of engine 216 based on the mode of operation of engine 216 sensed by engine mode detector 228. This predetermined criteria is established in the MCU in a format suitable for use in regulator operator 228.

Figure 20:
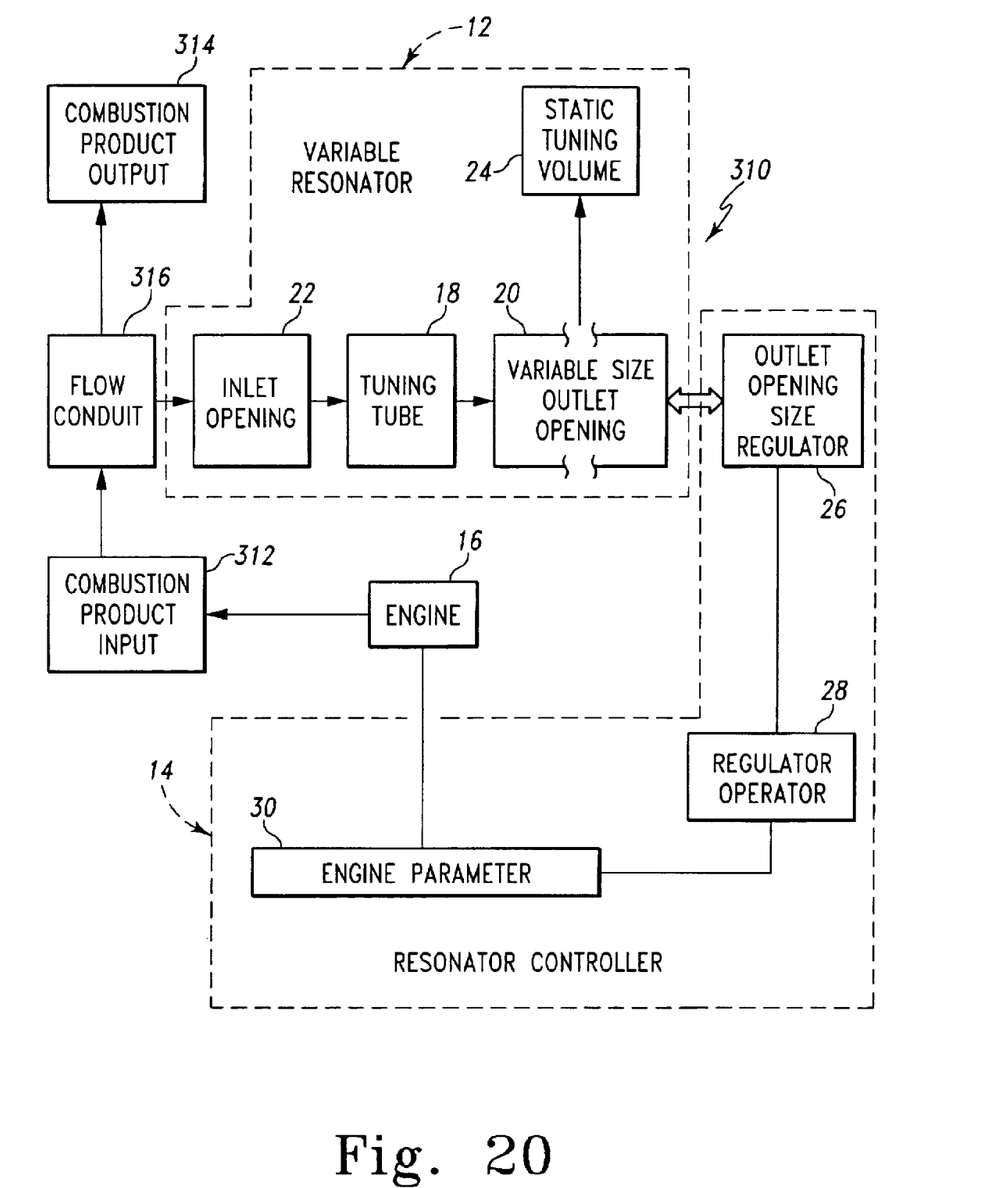
FIG. 20 is a diagrammatic view of yet another exhaust processor in accordance with the present disclosure showing a variable resonator arranged to communicate with combustion product flowing through a flow conduit located in an exhaust processor housing.
Figure 21:
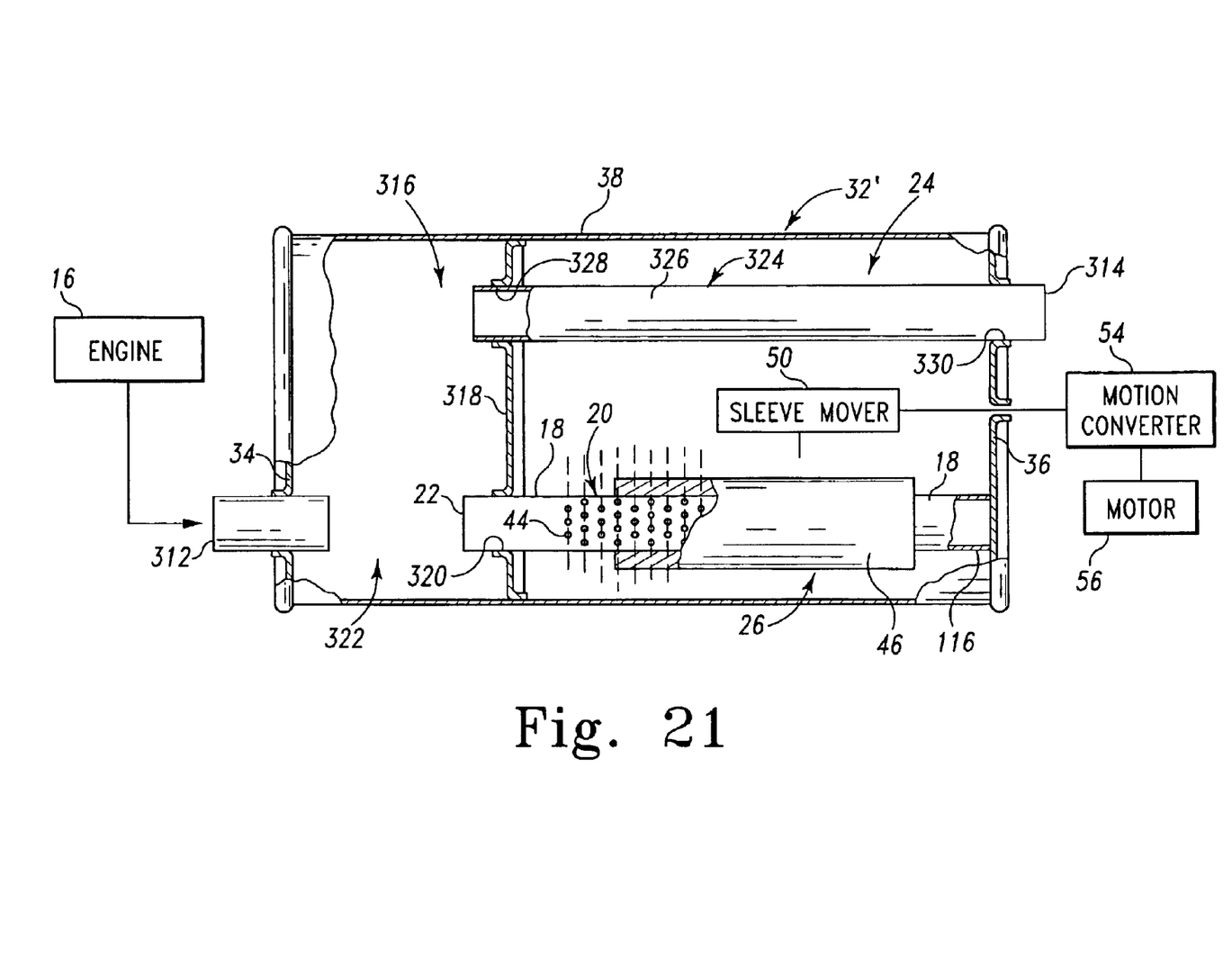
FIG. 21 is a side elevation view of an exhaust processor, with portions broken away, illustrative of the exhaust processor shown diagrammatically in FIG. 20.

An exhaust processor 310 similar to exhaust processor 10 of FIG. 1 is shown diagrammatically in FIG. 20 and illustratively in FIG. 21. In this embodiment, combustion product generated by engine 16 passes from a combustion product input 312 to a combustion product output 314 through a flow conduit 316. The inlet opening 22 of tuning tube 18 communicates with engine combustion product extant in flow conduit 316.

In the illustrative embodiment shown in FIG. 21, an interior baffle 318 is mounted in the interior region of resonator housing 32' and static tuning volume 24 is located between baffle 218 and second end wall 36. Tuning tube 18 has an inlet end extending through an aperture 320 formed in baffle 318 and sleeve 46 is movable in static tuning volume 24 on tuning tube 18 to open and close perforations 44 formed in tuning tube 18 and arranged to lie in static tuning volume 24. Flow conduit 316 includes an inlet section 322 bounded by first end wall 34, baffle 318, and a portion of side wall 38 located between first end wall 34 and baffle 318. Flow conduit 316 also includes an outlet section 324 coupled in fluid communication to inlet section 322 and defined by a tube 326 extending through static tuning volume 24. Tube 326 has an inlet extending through an aperture 328 formed in baffle 318 to receive engine combustion product from inlet section 322 and an outlet extending through an aperture 330 formed in second end wall 36.

A single muffler in accordance with the present disclosure could be used for tuning various engine configurations simply by altering the control logic. Such a muffler could also reduce or eliminate the need for multiple "passive" tuning elements within an exhaust system because "one" tuning chamber could be used to silence multiple frequencies. Such a muffler could be used for "camless" engines, where the engine could potentially switch to a four-, five-, six-, or eight-cylinder mode "on the fly." Such a muffler will potentially reduce muffler back pressure via eliminating multiple tuning chambers. Such a muffler will minimize exhaust system weight by "consolidating" multiple tuning elements into one.

What is claimed is:

1. An exhaust processor comprising
    a housing defining an interior region and having an inlet and an outlet,
    a flow conduit located in the interior region of the housing to conduct engine combustion product from the inlet to the outlet, a static tuning volume located in the interior region of the housing and separate from the flow conduit, a longitudinally extending tuning tube positioned to lie in the interior region of the housing to extend into the static tuning volume, the tuning tube being formed to include an inlet opening positioned to receive therein engine combustion product extant in the flow conduit and an outlet opening arranged to lie in the static tuning volume and to place the static tuning volume in acoustic communication with acoustic waves associated with engine combustion product in the tuning tube, and a regulator mounted for movement in the static tuning volume longitudinally alongside the tuning tube to vary the size of the outlet opening formed in the tuning tube.

2. The exhaust processor of claim 1, wherein the housing includes first and second end walls, at least one baffle, and a side wall arranged to extend from the first end wall to the second end wall to define the interior region therebetween and the flow conduit includes an inlet section bounded by the first end wall, the at least one baffle, and a portion of the side wall located between the first end wall and the at least one baffle and an outlet section defined by a tube extending through the static tuning volume and having an inlet extending through an aperture formed in the at least one baffle to receive engine combustion product from the inlet section and an outlet extending through an aperture formed in the second end wall.

3. The exhaust processor of claim 1, wherein the flow conduit includes an inlet section located outside the static tuning volume and an outlet section located in the static tuning volume.

4. The exhaust processor of claim 3, wherein the inlet section is configured as a chamber located to receive engine combustion product from the inlet, and the outlet section is configured as a tube located to conduct engine combustion product from the chamber through the static tuning volume to the outlet.

5. The exhaust processor of claim 1, wherein the housing includes an end wall and a baffle located in the interior region, the flow conduit includes a chamber defined between the end wall and the baffle, and the tuning tube is mounted to the baffle for communication with the chamber.

6. The exhaust processor of claim 1, wherein the flow conduit includes a tube located in the static tuning volume.

7. The exhaust processor of claim 6, wherein the housing includes a baffle located in the interior region, and the tuning tube and the tube are mounted to the baffle.

8. The exhaust processor of claim 6, wherein the housing includes an end wall, and the tuning tube and the tube are mounted to the end wall.

9. The exhaust processor of claim 8, wherein the regulator includes a sleeve surrounding the tuning tube, and further comprising a sleeve mover coupled to the sleeve and the end wall and configured to move the sleeve longitudinally alongside the tuning tube.

10. The exhaust processor of claim 6, wherein the housing includes a baffle and an end wall, the baffle is located in the interior region, the static tuning volume is defined between the baffle and the end wall, and the tuning tube and the tube extend from the baffle through the static tuning volume to the end wall.

11. An exhaust processor comprising a housing defining an interior region and having a housing inlet and a housing outlet, a static tuning volume located in the interior region, a chamber located in the interior region to receive engine combustion product from the housing inlet, a first tube extending from the chamber through the static tuning volume to the housing outlet to conduct engine combustion product from the chamber through the static tuning volume to the housing outlet, a longitudinally extending tuning tube located in the static tuning volume, the tuning tube including a tube inlet located to receive engine combustion product from the chamber and a tube outlet located in the static tuning volume for acoustic communication between the tuning tube and the static tuning volume through the tube outlet, and a regulator mounted for movement in the static tuning volume longitudinally alongside the tuning tube to vary the size of the tube outlet formed in the tuning tube.

12. The exhaust processor of claim 11, wherein the housing includes first and second end walls and a baffle located in the interior region between the first and second end walls, the chamber is defined between the first end wall and the baffle, and the static tuning volume is located between the second end wall and the baffle.

13. The exhaust processor of claim 12, wherein the first tube and the tuning tube extend from the baffle to the second end wall.

* * * * *